United States Patent
Westerberg et al.

(10) Patent No.: US 8,320,260 B2
(45) Date of Patent: Nov. 27, 2012

(54) METHOD OF MONITORING CELLS IN WIRELESS COMMUNICATION SYSTEMS

(75) Inventors: Erik Lars Westerberg, Enskede (SE); Kenneth Balck, Linköping (SE); Anna Pucar Rimhagen, Motala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 12/676,076

(22) PCT Filed: Sep. 5, 2007

(86) PCT No.: PCT/SE2007/050626
§ 371 (c)(1), (2), (4) Date: Jun. 8, 2010

(87) PCT Pub. No.: WO2009/031959
PCT Pub. Date: Mar. 12, 2009

(65) Prior Publication Data
US 2010/0254274 A1    Oct. 7, 2010

(51) Int. Cl.
*G01R 31/08* (2006.01)
*H04W 24/00* (2009.01)

(52) U.S. Cl. .................. 370/242; 370/252; 455/424
(58) Field of Classification Search .............. None
See application file for complete search history.

(56) References Cited

U.S. PATENT DOCUMENTS

| | | | |
|---|---|---|---|
| 5,095,500 A * | 3/1992 | Tayloe et al. | 379/32.01 |
| 7,499,700 B2 * | 3/2009 | Dillon et al. | 455/423 |
| 2003/0069010 A1 | 4/2003 | Eravelli | |
| 2006/0063521 A1 * | 3/2006 | Cheung et al. | 455/423 |

FOREIGN PATENT DOCUMENTS

| WO | 99/33297 | 7/1999 |
|---|---|---|
| WO | 01/93615 A1 | 12/2001 |

* cited by examiner

*Primary Examiner* — Nittaya Juntima
(74) *Attorney, Agent, or Firm* — Coats & Bennett, P.L.L.C.

(57) ABSTRACT

A wireless communication network automatically tests itself for sleeping cells. This is done by designing the base stations to regularly act as a terminal, contact its neighboring base stations and as a mobile perform a set of typical traffic cases. From the outcome of the traffic cases the probing base station detects neighboring base stations that cannot carry traffic. The information about sleeping cells is subsequently communicated from the base station to the operation and maintenance system.

21 Claims, 6 Drawing Sheets

METHOD OF MONITORING CELLS IN WIRELESS COMMUNICATION SYSTEMS

TECHNICAL FIELD

The present invention relates in general to radio communications and in particular to a method and a device for monitoring cells in wireless communication systems.

BACKGROUND

Wireless communication networks are well known and increasing in popularity. Mobile terminals, such as cell phones, wirelessly communicate through base stations or node B's in WCDMA that are associated with different cells or sectors in a geographic region, for example. With the increasing popularity and increased competition in wireless communications, system reliability and availability to the end user, is increasingly important.

The costs for operating radio networks are an increasing part of the operator's expenditure (OPEX). The OPEX is expected to further increase as the number of base stations, their geographical distribution across a wide area and the nature of wireless links require complex and sophisticated fault detection and recovery schemes. Fault detection is a required element of an approach to maintaining high reliability and availability. The challenge is to keep capital expenses under control while maintaining reliability and availability.

One significant scenario that can affect the reliability and availability of a wireless system is when one of the cells is a "sleeping cell". A sleeping cell as that term is used in this description is a faulty cell that has not generated an alarm or in any other way indicated a problem but still is not capable of carrying traffic. This can be caused e.g. by faulty configuration, faulty radio circuits or other critical hardware, memory or other resource leakage. One particular example could be that the configuration of broadcast information is corrupt so that mobile stations cannot read the system information required to access the radio cell. The impact of a sleeping cell is that mobile terminals in the corresponding coverage area cannot be served as the service disappears in a sleeping cell.

Detecting a sleeping cell in the existing technology is performed by manually monitoring the traffic patterns in a network. Cells that normally carry non-zero traffic volumes but where the traffic volume is seen to be zero for some time are listed as candidates and the network operator then visits the cells and actively checks if the site is working or not. The main problem with this approach is that all cells during times have no traffic due to low subscriber activity. Hence it is difficult to deduce if a time period of no traffic in a cell is caused by the cell being a sleeping cell or caused by the fact that no subscriber has tried to access the system. This causes problems in particular in cells with only moderate amount of daily traffic where a full day of zero traffic could but need not indicate a problem. Detecting a sleeping cell is more complex still when one considers that the amount of traffic varies at different times of the day during different seasons of the year.

A critical component in the method above is thus to determine just how long time of no traffic indicated should qualify a cell as a candidate sleeping cell. A too long time, like a week, would mean that truly sleeping cells would be identified and fixed at the earliest one week after the problem of the sleeping cell first occurred. Thus to set a long time before to react can lead to lengthy periods of service absence.

In contrast, a too short time, like an hour, would lead to many perfectly well-working cells (which due to subscriber inactivity have served no end-user during the hour) would be put on the list for time-consuming site visits. Hence a too short time leads to unnecessary and costly site visits to well-working cell. This leads to unnecessary and costly site visits to cells identified as faulty but where the main reason of no traffic is that no user tried to be connected for one day.

Traditionally, operator takes action only when zero-traffic persists for quite some time, i.e. one to three days. This to avoid site visits due to false alarms. However cells that take traffic only few days per week, but which are still important due to service coverage consideration are virtually impossible to detect as sleeping cells.

Consequently, one serious drawback with the method described above is a trade off between costly site visits and the time to react.

Hence there exist a need for a method and arrangements for automatically detecting sleeping cells and that at the same time are efficient in terms of fast detection and economical in terms of less site visits due to false alarms.

SUMMARY

A general problem with the wireless communication networks is that detecting a sleeping cell is difficult and costly. The operator has to rely on indirect indicators that are not accurate and lead to false alarms.

A general object of the present invention is to provide improved methods and arrangements for monitoring and checking sleeping cell candidates.

A further object of the present invention is to provide methods and arrangements giving opportunities for more accurately detecting base stations that can not carry traffic, i.e. sleeping cells.

A further object of the present invention is to provide a method enabling a first base station to monitor a second base station which is suspected of not being able to carry traffic, i.e. sleeping cell candidate.

These and other objects are achieved in accordance with the attached set of claims.

A first embodiment of the present invention provides a method for enabling a first base station to monitor a second base station in a cellular communications system, wherein the first base station sets up a radio communication channel and monitors the setting up procedure of said communication channel.

Another embodiment of the present invention provides a method for enabling a first base station to monitor a second base station in a cellular communications system, wherein the first base station sets up a radio communication channel. The established radio communication channel is used to upload and download data files between the first base station and a content server through the second base station, wherein the second base station monitors the data files transfer.

Yet another embodiment of the present invention provides a first base station for monitoring a second base station in a cellular communications system. Said first base station comprises a radio transceiver and a controller for setting up a radio communication channel with the second base station. Said controller is further adapted to monitor the setting up procedure.

Yet another embodiment of the present invention provides a first base station for monitoring a second base station in a cellular communications system. Said first base station comprises a radio transceiver and a controller for setting up a radio communication channel with the second base station. Said controller is further adapted to upload data files to a content server and download data files from the content server through the second base station. Said controller is further adapted to monitor the data files transfer.

An advantage of the present invention comprises enabling accurate and economical detection of sleeping cells. Since the method is not based on indirect indicators such as traffic patterns, the number of false alarms can be reduced to a minimum. With prior art a period of low traffic would indicate a cell as "sleeping" with a probability which may be as low as 50%, depending on the type of cell. In contrast, the present invention actively probes the base station so that a fault indication is accurate to within a fraction of a percent.

Another advantage is that the probing can be done as often as desired and the time from base station fault occurrence and detection is dramatically reduced. The probing could also be configured to be executed after only an hour on no traffic so that sleeping cells are detected and alarmed to the operator at most sixty minutes after the occurrence of the problem. This dramatically decreases the service down time resulting from sleeping cells.

BRIEF DESCRIPTION OF THE DRAWINGS

The present invention will now be described in more by way of non-limiting examples and with reference of the accompanying drawings, in which.

DETAILS DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The technology is described in the context of a Long Term Evolution (LTE) of UMTS in order to provide an example and a non-limiting context for explanation. The ideas of the present invention are equally applicable to many types of cellular systems consisting of a plurality of base stations, where accurate and economical detection of sleeping cells is necessary but difficult to provide.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Universal Mobile Telecommunications System (UMTS) is one of the third-generation (3G) mobile phone technologies. Currently, the most common form uses W-CDMA as the underlying air interface, is standardized by the 3rd Generation Partnership Project (3GPP), and is the European answer to the ITU IMT-2000 requirements for 3G cellular radio systems. The Long Term Evolution (LTE) of UMTS is under discussion by the 3GPP which standardized UMTS. The objective of the LTE work is to develop a framework for the evolution of the 3GPP radio-access technology towards a high-data-rate, low-latency and packet-optimized radio-access technology. So the focus is on supporting services provided from the packet switched (PS)-domain.

Figure 1:
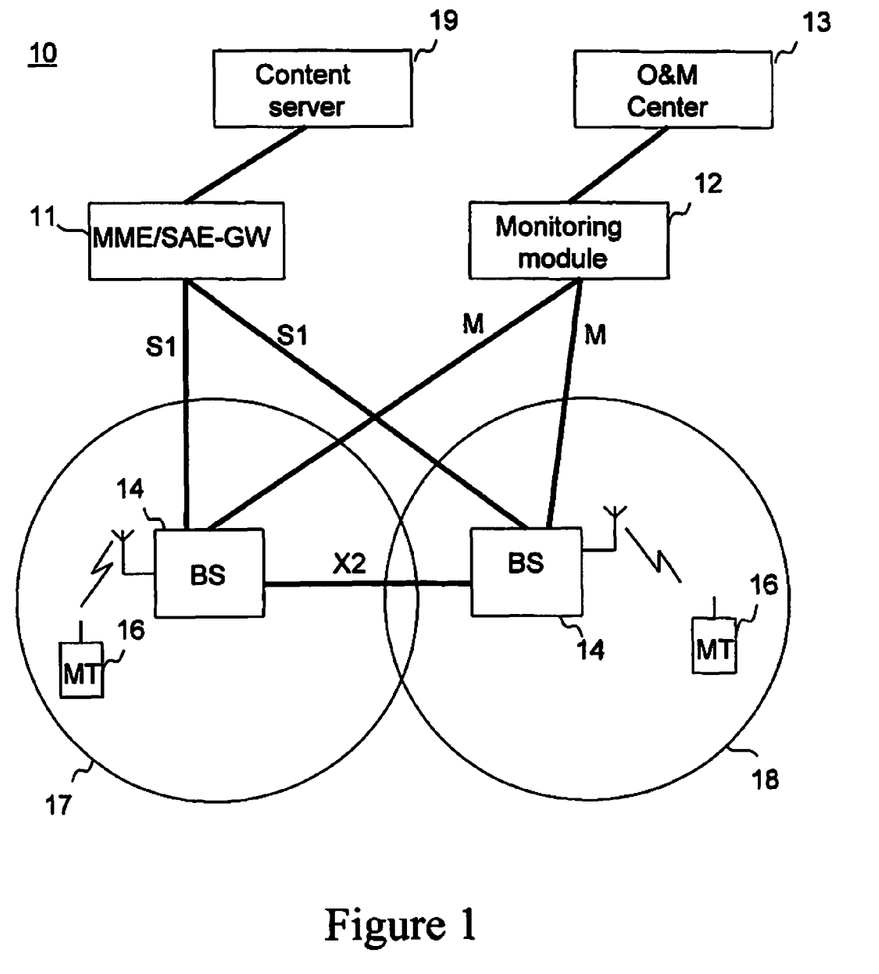
FIG. 1 is a schematic view of a cellular communication system according to the invention.

FIG. 1 illustrates a LTE system 10 sometimes referred to evolved-UTRAN (e-UTRAN). The LTE system includes Base Stations (BS) 14 which communicate together over an X2 interface. The base stations 14 are sometimes referred to as enhanced node B's (eNBs) because of the additional functionality performed by the base stations as compared to regular UTRAN base stations. The base stations 14 communicate over an S1 interface with an evolved packet core (EPC) which includes one or more nodes labeled as mobility management entity (MME)/System Architecture Evolution Gateway (SAE-GW) 11 and with a content server 19 via the SAE-GW 11.

The base stations 14 communicate over the radio/air interface with radio Mobile Terminals (MT) 16 also referred to as User Equipment (UE). A plurality of cells or sectors includes base stations that are geographically distributed in a known manner. The portion of the example system that is illustrated in FIG. 1 includes two cells 17 and 18.

In one example the base stations 14 communicate over an M interface illustrating one example of communication interface but could be any other interface as well, with a monitoring module 12 that monitors the performance of the system. The monitoring module 12, which is connected to the operation and Maintenance Center (OMC) 13, includes software, hardware, firmware or a combination of them designed to monitor the system for fault conditions. A variety of fault conditions may be determined. A sleeping cell is considered as an example of fault conditions in this document, and other fault conditions may be detected using an appropriately designed embodiment of this invention.

In another example the monitoring module 12 is maintained independent of critical components responsible for cell or network operation, for example, in the OMC 13 within the operation and maintenance (O&M) system of the operator. In another example (not shown) the monitoring module 12 may be incorporated in the MME/SAE-GW 11. There need not be a single physical location for the various components or portion of the monitoring module 12. In one example, each cell 17 and 18 has a monitoring module 12 associated with it that then communicates with a central unit, for example, when a central unit is used for monitoring or making determinations regarding potential fault conditions or actual fault conditions.

Furthermore, the base stations 14 communicate with a content server 19 via the SAE-GW 11. The content server 19 is a server that provides applications like web based applications or other applications to the mobile terminals. The content server 19 may be seen as a separate node as shown in FIG. 1, or as a unit incorporated in another node like MME/SAE-GW.

One skilled in the art realizes the infrastructure depicted in FIG. 1 may further include other network elements, such as one or more gateways and one or more Operations and Maintenance Centers (OMC). FIG. 1 is provided merely to illustrate the principals of the present invention and is not intended to be an exclusive depiction of communication system 10.

In the standardization work within LTE, Frequency Division Duplex (FDD) mode and Time Division Duplex (TDD) mode are standardized. The idea of the invention will be described in the TDD mode of LTE system, but is equally applicable to the FDD mode of LTE system as well.

Figure 2:
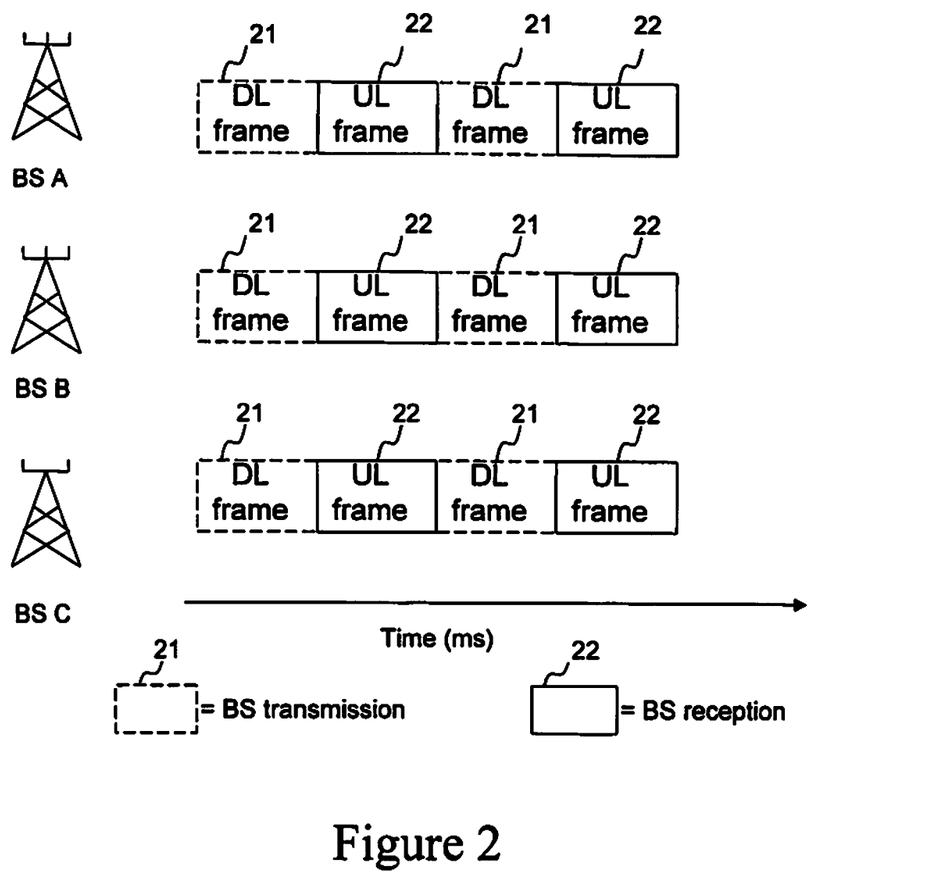
FIG. 2 is a view of a protocol for transmission illustrating uplink and downlink communication in time domain according to the prior art.

Referring to FIG. 2, protocol for transmission uplink and downlink communication in time domain is illustrated. In the TDD mode of LTE is presented, an unpaired frequency band is defined from which both the uplink and downlink channels are selected. A TDD transceiver can therefore not transmit and receive simultaneously. The uplink communication and downlink communication in the TDD system is alternating in time. This is controlled by a time slot structure, where two time slots of 0.5 ms length each constitute a 1 ms frame. Downlink (DL) frames 21 are used for communication from the base station to the mobile terminals and Uplink frames 22 are used for communication from the mobile terminals to the base stations.

To provide good coverage, base stations are usually placed at elevated positions. As a result, there is often line-of sight propagation between base stations. Uplink traffic in one base station can therefore be severely interfered by downlink traffic of an adjacent base station. In order to avoid this interference problem, all base stations within a network are timed synchronized. This means that under normal operating conditions all base stations transmit only during the downlink frames 21 and receive signals only during the uplink frames 22, where the downlink frames 21 occur simultaneously across the full network and where the uplink frames 22 occur simultaneously across the full network. This is called TDD time synchronization and is illustrated in FIG. 2.

As described in the background, sleeping cells, as that term is used in this description, is a faulty cell that has not generated an alarm or in any other way indicated a problem but still is not capable of carrying traffic. The impact of a sleeping cell is that mobile terminals in the corresponding coverage area cannot be served as the service disappears in a sleeping cell.

Figure 3:
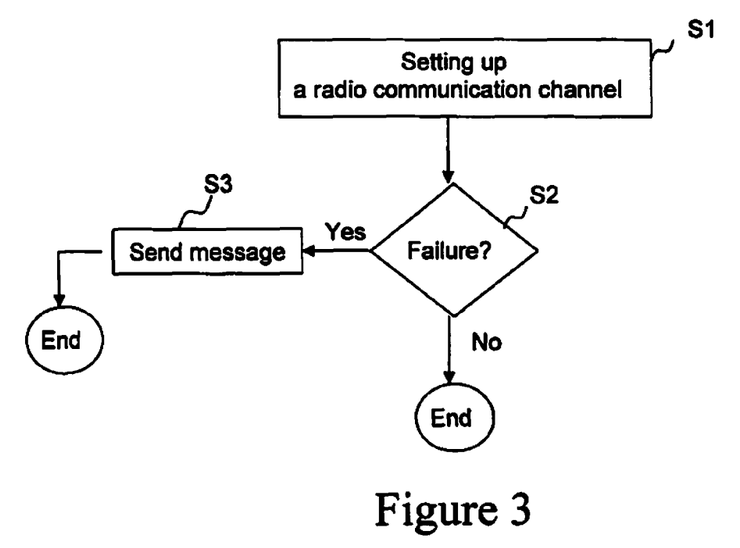
FIG. 3 is a schematic flow diagram according to one aspect of the invention.
Figure 4:
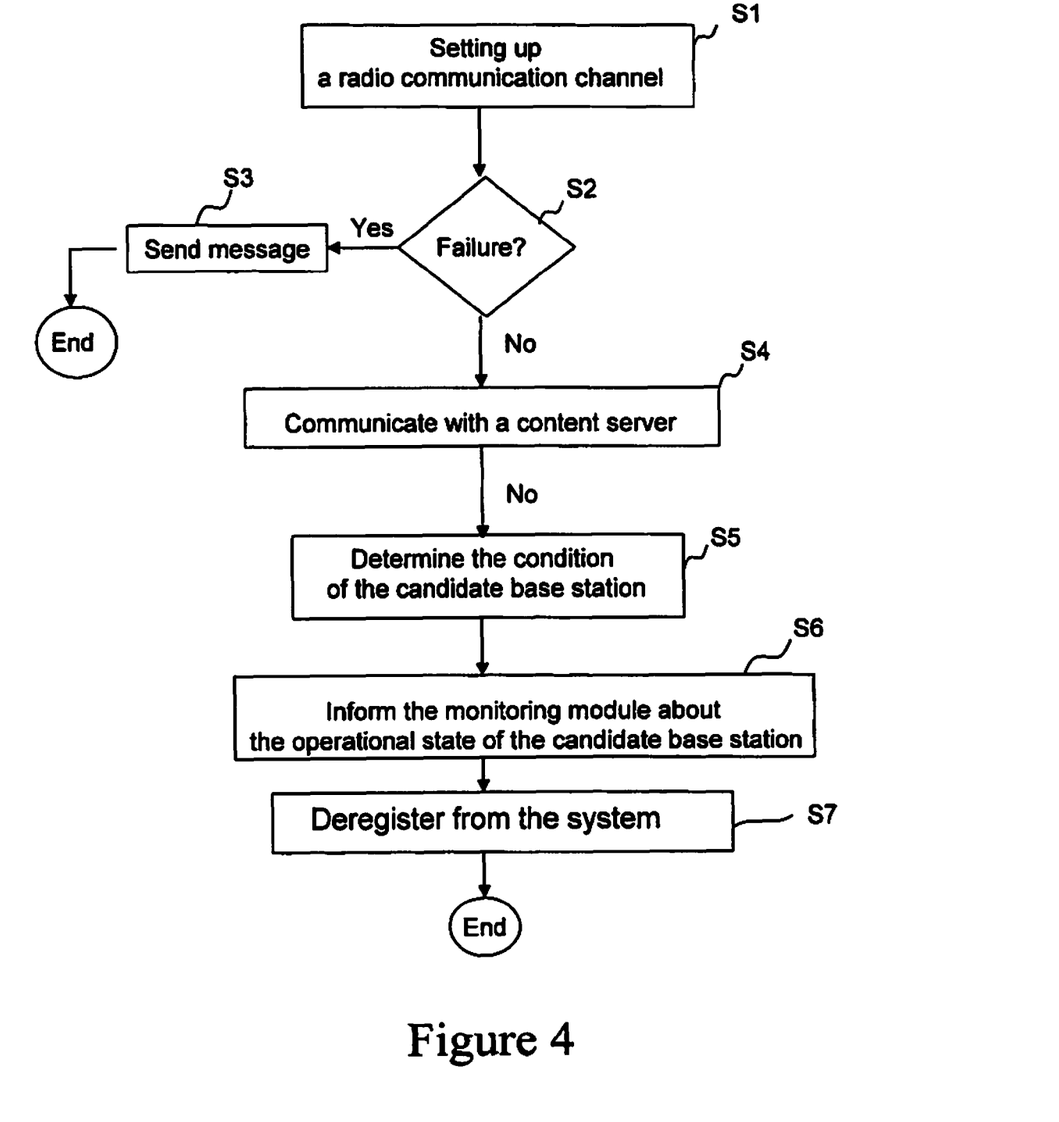
FIG. 4 is a schematic flow diagram according to one aspect of the invention.

With reference to FIGS. 3 and 4, embodiments of the invention monitoring the performance of a sleeping cell candidate will now be described.

FIG. 3 is a schematic flow diagram that illustrates an example, non-limiting procedures for monitoring the performance of a base station associated with a sleeping cell candidate. A sleeping cell candidate is a cell that normally carries traffic volume but when the traffic volume is seen to be zero for some time, the cell is suspected by the monitoring module to be faulty. This information is mediated to the monitoring module either directly from the base station itself or by the OMC that in turn monitors the traffic flows through the base stations, or by any other node that maintain information about the traffic volumes that flow through the individual base stations.

A neighboring base station either receives a request for monitoring the performance of a candidate base station from the monitoring module or automatically initiates monitoring the performance of a candidate base station. The candidate base station is a base station associated with a sleeping cell candidate. The neighboring base station is a base station within radio distance of the candidate base station, i.e. the neighboring base station and the candidate base station are located in such a way that a radio communication signal from the candidate base station can be detected and decoded at the position of the neighboring base station and vice versa.

Figure 6:
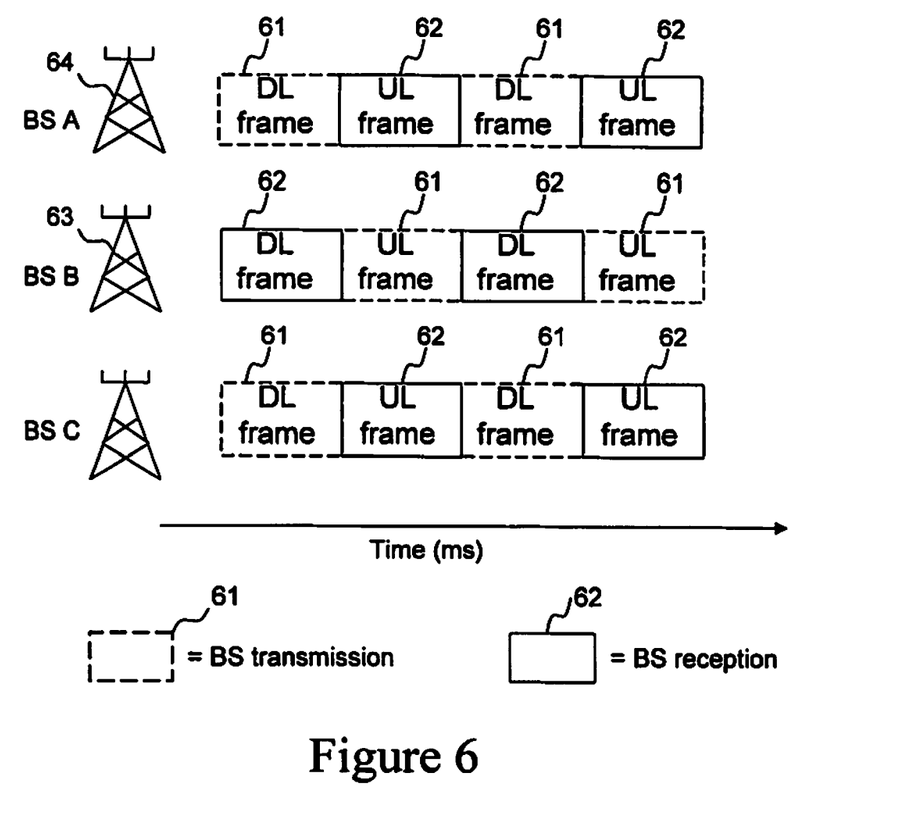
FIG. 6 is a view of a protocol for transmission illustrating uplink and downlink communication in time domain according to the invention.

The neighboring base station communicates with the candidate base station over the radio interface step S1 to set up a radio communication channel. When communicating with the candidate base station, the neighboring base station emulates a mobile terminal by following the protocols and procedures defined for such mobile terminal in the LTE system, and appears as a mobile terminal that uses the offered communication service of the candidate base station. In particular this means that the neighboring base station when emulating a mobile uses the frequencies and time slots as is required by the mobile station. In a LTE FDD system this means, among others, that the base station in its communication with the candidate base station uses the uplink frequency band for transmission and the downlink frequency band for reception of radio signals. In the LTE TDD system this means, among others, that the that the base station in its communication with the candidate base station uses the uplink frames for transmission and the downlink frames for reception of radio signals as illustrated in FIG. 6. The established radio communication channel is used in a first step to make an initial access, to register to the network and to establish a radio bearer for user data in the same manner as a mobile terminal accesses the candidate base station.

However if step S1 fails, possibly after a predetermined number of attempts, i.e. the radio communication channel setting up fails, the neighboring base station determines that mobiles are not able to set up radio connections to the candidate base station, i.e. the candidate base station is indeed a sleeping cell step S2. Subsequently the neighboring base station informs the monitoring module and possibly the OMC via the monitoring module about the status of the candidate cell step S3. The neighboring base station deregisters from the system, leaves the terminal emulation mode and resumes normal operation.

FIG. 4 is a schematic flow diagram according to one aspect of the present invention. A neighboring base station either receives a request for monitoring the performance of a candidate base station from the monitoring module or automatically initiates monitoring the performance of a candidate base station. The candidate base station is a base station associated with a sleeping cell candidate. The neighboring base station is a base station within radio distance of the candidate base station, i.e. the neighboring base station and the candidate base station are located in such a way that a radio communication signal from the candidate base station can be detected and decoded at the position of the neighboring base station and vice versa.

The neighboring base station communicates with the candidate base station over the radio interface step S1 to set up a radio communication channel. When communicating with the candidate base station, the neighboring base station emulates a mobile terminal by following the protocols and procedures defined for such mobile terminal in the LTE system, and appears as a mobile terminal that uses the offered communication service of the candidate base station. In particular this means that the neighboring base station when emulating a mobile uses the frequencies and time slots as is required by the mobile station. In a LTE FDD system this means, among others, that the base station in its communication with the candidate base station uses the uplink frequency band for transmission and the downlink frequency band for reception of radio signals. In the LTE TDD system this means, among others, that the base station in its communication with the candidate base station uses the uplink frames for transmission and the downlink frames for reception of radio signals as illustrated in FIG. 6. The established radio communication channel is used in a first step to make an initial access, to register to the network and to establish a radio bearer for user data in the same manner as a mobile terminal accesses the candidate base station. However if step S1 fails, possibly after a predetermined number of attempts, i.e. the radio communication channel setting up fails, the neighboring base station determines that mobiles are not able to set up radio connections to the candidate base station, i.e. the candidate base station is indeed a sleeping cell step S2. Subsequently the neighboring base station informs the monitoring module and possibly the OMC via the monitoring module about the status of the candidate cell step S3. The neighboring base station deregisters from the system, leaves the terminal emulation mode and resumes normal operation.

If the step S1 is successful, i.e. the radio communication channel is successfully established, the neighboring base station uses the radio communication channel to communicate with a content server through the candidate base station step S4. The communication through the candidate base station is here chosen to be the upload of one data file from the neighboring base station to the content server and the download of an another file from the content server through the candidate base station to the neighboring base station. However, the form of communication can be any kind of communication that is offered by the system under normal operation.

In step S5, The neighboring base station records and evaluates the result of the communication. The record can include for example whether or not a downloaded file was received within a predetermined timeframe, the download time, the value of the Bit Error Rate (BER), the packet loss rate and more. Based on the communication result the neighboring cell can determine whether the candidate base station is operating or not. Specifically, in the case of a failed communication the neighboring base station can conclude that the candidate base station does not support the communication service which indicates a faulty cell. Note that the fault in this case can be located anywhere in the communication chain between the radio interface and the content server, e.g. in the radio base station, in the transmission path "S1" or in the MME/SAE-GW.

The information about the operational state of the candidate base station is then transmitted from the neighboring base station to the monitoring module for further handling step S6, possibly including alarming the operator if the candidate base station is not operating according to expectations.

In addition to the evaluation done locally in the neighboring base station (as described above) the neighboring base station can transmit the record itself to a central point in the network. This central point can be the monitoring module, the O&M center or any other node capable of receiving and evaluating the records from a set of base stations. Based on records transmitted from a multitude of neighboring base stations the central node can make conclusions about where in the communication chain a potential fault is most likely to be. If e.g. only the communication from a single base station has failed it is likely that the fault is in the base station, or at least in equipment that is not used in the communication path from other base station. If the records indicate that the communication with the content server has failed through a large set of base station the fault is most likely in a node or equipment that is common for the communication paths from all the failing base stations, e.g. a SAE GW or a common transmission network.

After the evaluation and the transmission of records and/or evaluation results to the monitoring center the neighboring base station deregisters from the system, leaves the terminal emulation mode and resumes normal operation step S7.

Figure 5:
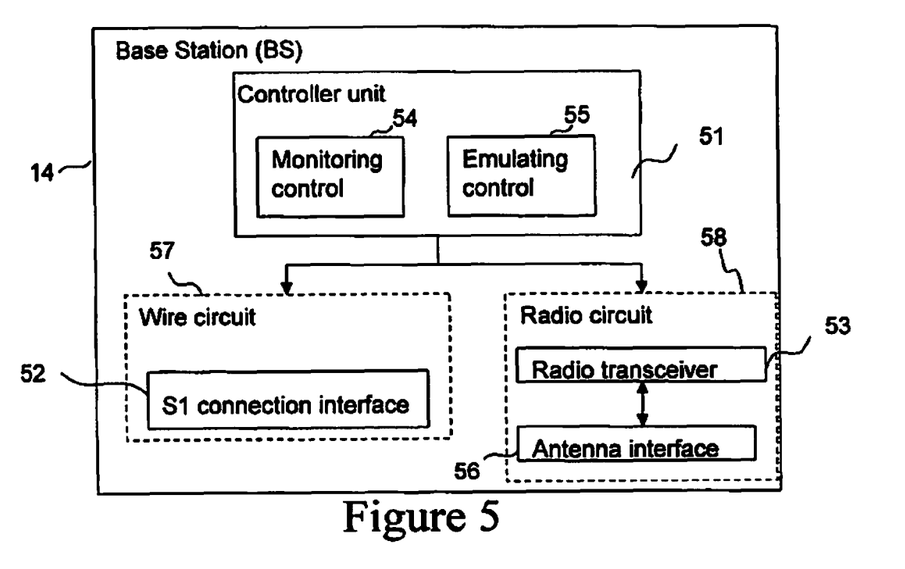
FIG. 5 is a function block diagram of a non-limiting example of a base station for monitoring a candidate base station according to the invention.

FIG. 5 is a function block diagram of a non-limiting example of a base station 14 adapted to monitor a candidate base station in accordance, for example, with the procedures described above. The base station 14 includes a controller 51, a wired circuit 57 having a S1 connection interface 52, and a radio circuit 58 having a radio transceiver 52 coupled to an antenna interface 56. The controller 51 handles the data processing of monitoring operations associated with the received monitoring request and could be configured to automatically execute monitoring operations after a certain time period or in response to a predefined traffic condition. The S1 connection interface is adapted to receive and transmit information on the S1 connection. The radio transceiver 52 performs the baseband processing, filtering, frequency translation, amplification, and other operations necessary for radio communication.

The controller 51 includes several control entities, two of which shown in FIG. 4: a monitoring control 54 and an emulating control 55.

The monitoring control 54 receives and transmits monitoring-related messages such as monitoring requests and reports and also performs monitoring operations such as fault detection process. The received monitoring request may include as an example the identity of the candidate base station and mobile terminal related information to be used by the emulating control in the radio communication channel setting up process. The mobile terminal related information may include the same information stored in a Subscriber Identity Module (SIM) card such as the International Mobile Subscriber Identifier (IMSI). In another embodiment mobile terminal related information is not included in the monitoring request but is preconfigured in the base station and could be retrieved by the emulating control 55 when needed.

The emulating control 55 is used to change the mode of the base station to a terminal emulation mode and to follow the protocols and procedure defined for mobile terminals in the LTE TDD system. When changing the mode of the base station to a terminal emulating mode, the emulating control 55 sets up a radio communication channel with a candidate base station by making an initial access, registering to the network and establishing a radio bearer for user data. In one embodiment the emulating control 55 cancels the normal operation of the base station 14 when starting the emulation process and schedules the emulation process to occur in periods of low traffic in the base station 14, i.e. other mobile terminals will not be able to use the services offered by the base station 14 in the terminal emulation mode. In another embodiment, the emulating control 55 uses a fraction of the spectrum of the base station 14 for the terminal emulation mode, while the remaining fraction of spectrum is used for normal operation of the base station 14, i.e. mobile terminals will be able to use a fraction of the offered capacity of the base station 14.

FIG. 6 illustrates a protocol for transmission illustrating uplink and downlink communication in time domain according to one aspect of the invention. As explained in FIG. 2, in the TDD mode of LTE, an unpaired frequency band is defined from which both the uplink and downlink channels are selected. A TDD transceiver can therefore not transmit and receive simultaneously. The uplink communication and downlink communication in the TDD system is alternating in time as explained.

Downlink (DL) frames 61 are used for communication from the base station to the mobile terminals and Uplink frames 62 are used for communication from the mobile terminals to the base stations. After receiving a monitoring request at base station (BS B) 63 to monitor a sleeping cell candidate in this case base station (BS A) 64, the BS B 63 emulates a mobile terminal and appears as a mobile terminal to the candidate base station (BS A) 64. To be able to emulate a mobile terminal, the BS B 63 use the downlink time frame 61 for reception and the uplink time frame 62 for transmission as illustrates in FIG. 5.

Figure 7:
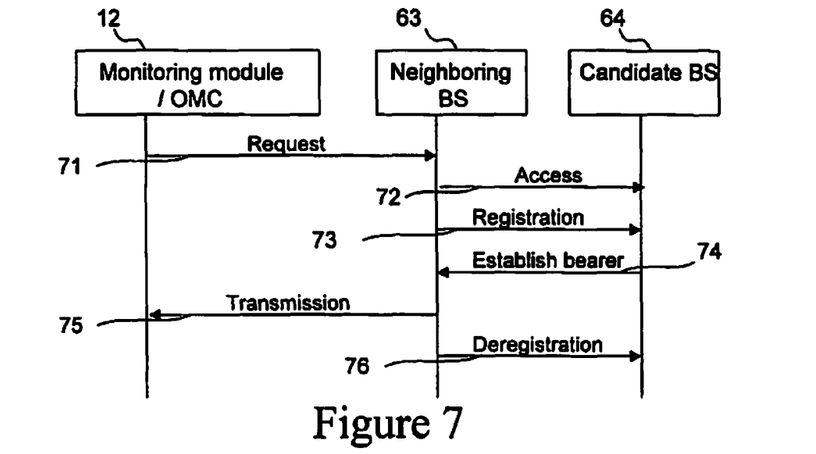
FIG. 7 is a signalling diagram according to one embodiment of the invention.

FIG. 7 illustrates a signaling diagram according to one embodiment of the invention. The monitoring module 12 sends a monitoring request 71 to neighboring BS 63. When the monitoring request 71 is received, the neighboring BS 63 communicates with the candidate BS 64 over the radio interface to set up a radio communication channel. In another embodiment of the invention, not illustrated in FIG. 7, the neighboring BS 63 automatically communicates with the candidate BS 64 over the radio interface to set up a radio communication channel without receiving the monitoring request. When communicating with the candidate BS 64, the neighboring BS 63 emulates a mobile terminal by sending an access request 72 to the candidate BS 64 and then the neighboring BS 63 send registration information 73 to the candidate BS 64. Upon receiving the registration information the candidate BS 64 establishes a radio bearer 74 for user data. The neighboring BS 63 monitors the establishment of the radio communication channel and if one the above described signaling fails, i.e. one of the signaling 72, 73 or 74 fails, the neighboring BS 63 transmits monitoring information 75 indicating the failure to the monitoring module 12 and the neighboring BS 63 performs deregistration 76 from the network and resumes normal operation.

Figure 8:
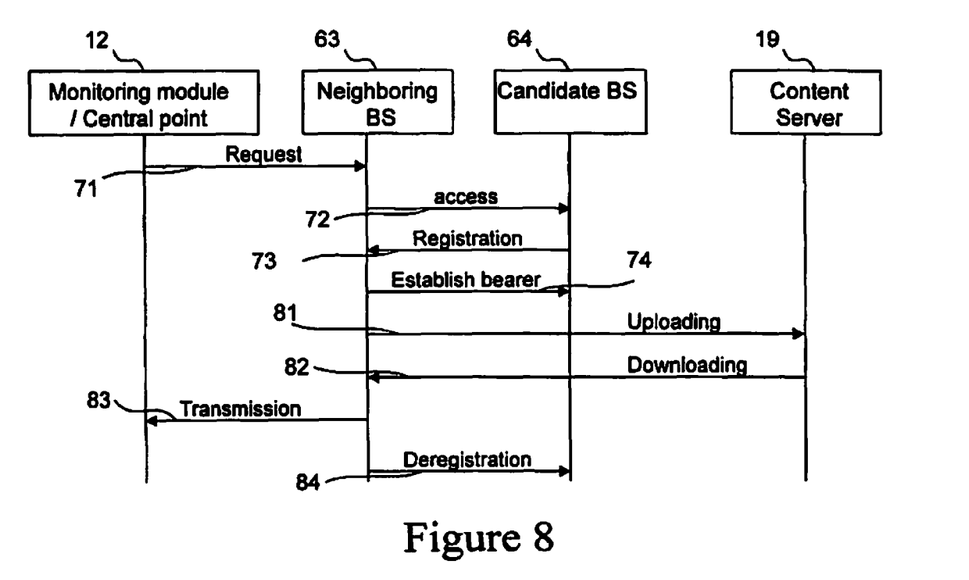
FIG. 8 is a signalling diagram according to another embodiment of the invention.

FIG. 8 illustrates a signaling diagram according to another embodiment of the invention. Comparing to FIG. 7, the signaling 71, 72, 73 and 74 are the same, i.e. receiving a monitoring request and establishing a radio communication channel is performed in the same way, but in this case the neighboring BS 63 successfully establishes a radio communication channel with the candidate BS 64. When the radio communication channel is successfully established the neighboring BS 63 uploads 81 first data file 81 to the content server 19 through the candidate BS 64. The Content server 19 downloads 82 a second data file to the neighboring BS 63 through the candidate BS 64. The neighboring BS 63 monitors the communication with the content server 19 and transmits 83 monitoring information to the monitoring module 12 indicating the failure or the success of the data file transfers. The monitoring information is sent to a central point (CP) in the network. This central point can be the monitoring module 12, the O&M center 13 or any other node capable of receiving and evaluating the monitoring information. When the monitoring information is sent, the neighboring BS 63 deregisters 84 from the network and resumes normal operation.

The present invention may be embodied in many different forms and should not be construed as limited to the embodiments set forth herein; rather, these embodiments are provided so that this disclosure will be thorough and complete, and will fully support the enclosed set of claims.

The invention claimed is:

1. A method for monitoring the performance of at least a second base station among a plurality of base stations in a cellular communications system, said method comprising:
    setting up a radio communication channel for communication between a first base station and the second base station;
    monitoring by the first base station the communication between the first and second base stations;
    initiating by the first base station a connection being set up between the first base station and a content server, through the second base station; and
    monitoring by the first base station the connection between the first base station and the content server.

2. The method of claim 1, wherein said step of setting up the radio communication channel is performed in response to a monitoring request generated by a monitoring module for monitoring the performance of said second base station.

3. The method of claim 2, wherein the monitoring module is incorporated within the first base station.

4. The method of claim 2, further comprising the steps of:
    monitoring the setting up of the radio communication channel; and
    transmitting monitoring information in response to the failure of setting up the radio communication channel.

5. The method as claimed in claim 1, wherein said step of setting up the radio communication channel is performed in response to a received monitoring request transmitted from a monitoring module.

6. The method of claim 1, wherein said step of setting up the radio communication channel comprises emulating a mobile terminal.

7. The method of claim 6, wherein said step of setting up the radio communication channel comprises:
    registering the emulated mobile terminal at said second base station; and
    establishing a radio bearer for user data.

8. The method of claim 1, further comprising transmitting monitoring information in response to a predetermined condition being fulfilled.

9. The method of claim 8, further comprising the steps of:
    uploading from the first base station a first file to the content server; and
    downloading from the content server a second file to the first base station.

10. The method of claim 9, wherein the predetermined condition indicates the success or failure of the file transfers.

11. A first base station for monitoring the performance of a second base station in a radio communication system, wherein said base station comprises:
    a radio transceiver;
    a controller, coupled to said transceiver, and adapted to initiate a procedure for setting up a radio communication channel with the second base station using said radio transceiver in response to a monitoring request, wherein said controller is further adapted to:
    monitor the setting up procedure;
    initiate a connection with a content server being set up through the second base station; and
    monitor the connection between said first base station and the content server.

12. The first base station of claim 11, wherein the monitoring request for monitoring the performance of said second base station is generated by a monitoring module.

13. The first base station of claim 12, wherein the monitoring module is incorporated within said first base station.

14. The first base station of claim 12, wherein the controller is further adapted to transmit monitoring information to the monitoring module center in response to a faulty condition during the setting up of the radio communication channel.

15. The first base station of claim 11, wherein the monitoring request for monitoring the performance of said second base station is transmitted from a monitoring module.

16. The first base station of claim 11, wherein the controller is further adapted to emulate a mobile terminal in the setting up of the radio communication channel.

17. The first base station of claim 16, wherein the radio transceiver is adapted to transmit on an uplink channel intended for transmitting information from a mobile terminal to a base station, and to receive on a downlink channel intended for transmitting information from a base station to a mobile terminal.

18. The first base station of claim 17, wherein the controller is adapted to access the second base station, register the emulated mobile terminal and establish a radio bearer for user data in the same way as a mobile terminal sets up a radio communication channel with the second base station.

19. The first base station of claim 11, wherein the controller is further adapted to upload a first file to the content server and to download a second file to said first base station.

20. The first base station of claim 19, wherein the controller is further adapted to transmit monitoring information in response to a predetermined condition in the connection between said first base station and the content server.

21. The first base station of claim 20, wherein the predetermined condition indicates the success or failure of the file transfers.

\* \* \* \* \*